Feb. 22, 1944.　　　W. J. JOYCE　　　2,342,146

LENS HOLDER

Filed Nov. 8, 1941

WILLIAM J. JOYCE
INVENTOR

BY

ATTORNEY

Patented Feb. 22, 1944

2,342,146

UNITED STATES PATENT OFFICE 2,342,146

LENS HOLDER

William J. Joyce, Southbridge, Mass., assignor to American Optical Company, Southbridge, Mass., a voluntary association of Massachusetts Application November 8, 1941, Serial No. 418,369

8 Claims. (Cl. 51—277)

This invention pertains to lens holders and more particularly to an improved lens holder which is simple in construction and more efficient in operation and novel method of holding one or more pieces of work with a substantially constant holding pressure.

It is therefore an object of the invention to provide an improved lens holder which is simple in construction and more efficiently operative so that a group of lenses in varying numbers may be gripped by the lens holder while maintaining substantially a constant pressure on the lens group regardless of the number of lenses in said group held by the lens holder or the thicknesses or shapes of the individual lens or lenses.

A further object of the invention is to provide an improved lens holder having a lever arrangement so that the leverage in operating the lens gripping bifurcated member will decrease as the applied pressure on the lever is increased.

A further object of the invention is to provide a lens holder for positioning and gripping one or more lenses of a lens group with substantially a constant pressure regardless of the number of lenses and depending primarily on the arrangement of parts and the characteristics of the various elements comprised in the lens holder.

A further object of the invention is to provide improved means for group gripping of lenses in a lens holder so that the lenses in the group will have a constant gripping pressure therebetween regardless of the number of lenses held by the holder which is adapted to insert the group of lenses in the edging machine between the lens arbors to exert a holding pressure therebetween on substantially the same axis of the various lenses in the group.

A further object of the invention is to provide a lens holder which requires a force to open the lens gripping jaws, and a release of the force to grip with a substantially constant pressure the lens or lenses without any additional manually applied spring tension after the lens gripping forks engage the lenses, regardless of the number of lenses held by the lens holder.

It is a further object of the invention to provide a lens holder with compensating means for maintaining a constant pressure on the jaws of the lens holder when the manually applied force to the spring is removed.

Other and further objects of the invention should be readily apparent from the following description taken in connection with the accompanying drawing and it is to be understood that modifications and changes in the specific details of construction shown and described may become apparent to one skilled in the art. The present disclosure is by way of illustration only, and equivalent parts may be interchanged without departing from the spirit of the invention as defined by the subjoined claims.

Figures 1, 2, 3, 4:
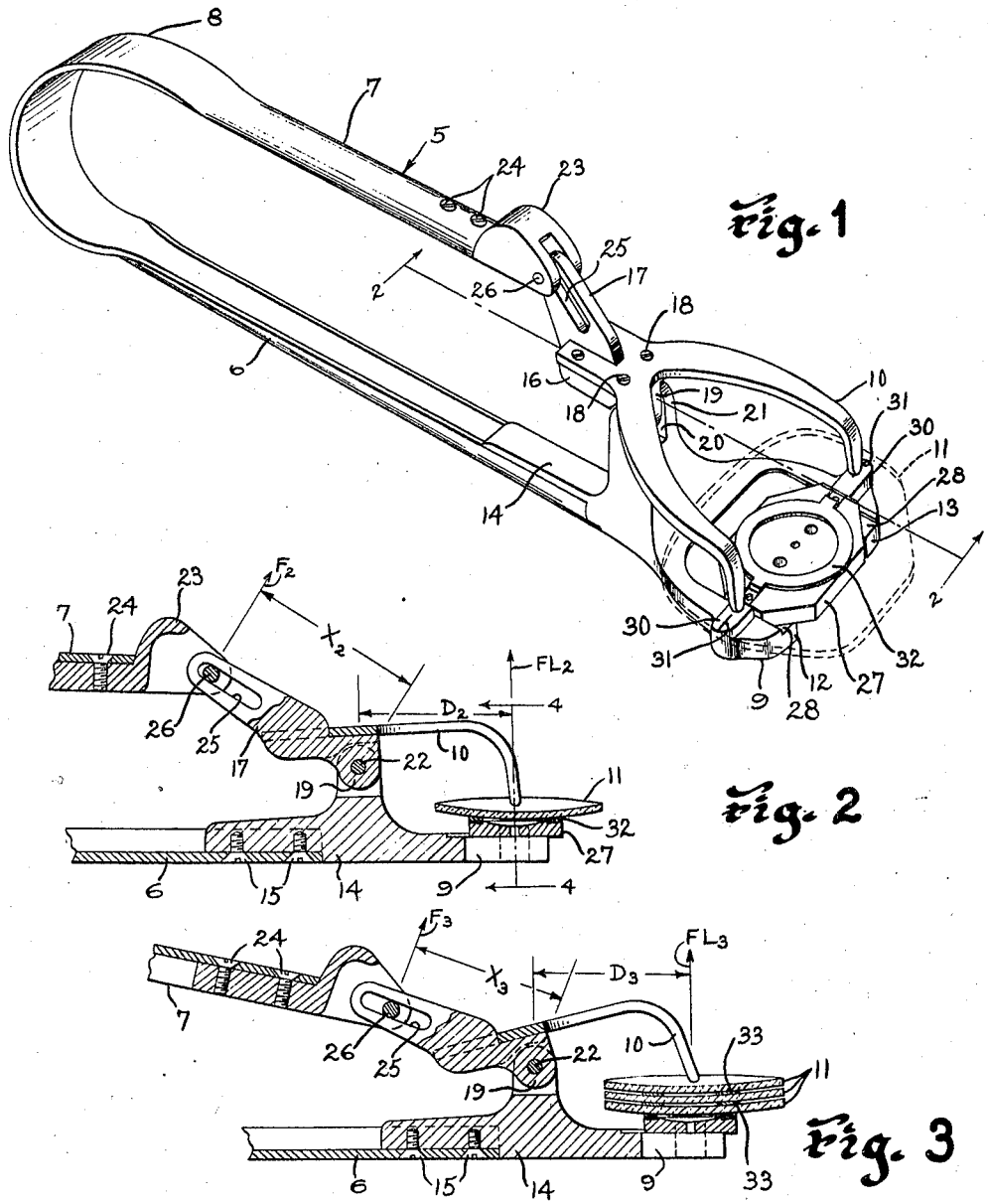
Fig. 1 is a perspective view of the improved lens holder showing a single lens in dotted lines being properly aligned and gripped by the lens holder.
Fig. 2 is a sectional view partially broken away taken along lines 2—2 of Fig. 1.
Fig. 3 is a view somewhat similar to Fig. 2 but shows the lens holder gripping 3 lenses of a lens group.
Fig. 4 is an enlarged sectional view partially broken away taken along lines 4—4 of Fig. 2 showing the pad holder on the positional means of one jaw of a lens holder.

Referring to the drawings and more particularly to Fig. 1, a handle 5 comprises a base member 6 with and a movable arm 7 which are integral with a spring portion 8. The movable arm and the base member 6 are both U-shaped in cross section so that rigidity is added to both the base member and the movable arm to prevent bending. The U-shaped cross section therefore causes the arms 6 and 7 of the handle 5 to remain substantially straight along a given axis while the spring portion 8, which is of resilient metal, tends to force the members 6 and 7 apart from each other. The action of the spring portion 8 urges the movable jaw 10 toward the stationary jaw 9 so that the lens 11 (shown dotted) will be securely gripped between said bifurcated jaw 10 and pad 32 held by stationary jaw 9. The stationary jaw 9 has two prongs 12 and 13 which form a bifurcated lower stationary jaw which has an extension 14 that fits into the U-shaped portion of the base member 6 and is secured thereto by screws 15. The movable jaw 10 is secured to a shoulder 16 on either side of the link or lever 17 by screws 18. The lower end of the link 17 has a lug portion 19 which engages a slot 20 between the two ears 21. The lug 19 is pivotally connected to the ears 21 by a pin 22.

The free end of the movable arm 7 has a yoke 23 which is secured in the U-shaped portion of the movable arm 7 by screws 24. The opposite end of the link 17 has an elongated slot 25 therein with said slot being slidably connected to the yoke 23 by a pin 26. A pad holder 27 rests on the shoulders 28 of the prongs 12 and 13 and is positioned thereon by inserting aligning pins 29 (Fig. 4) in the complemental apertures of the pad holder 27. Axis aligning plugs 30 have indicia 31 thereon so that the lens 11 may be properly aligned thereon.

Prior to the positioning of the lens in the lens holder, said lens has a central point or cross mark thereon which indicates the center of the lens, and has dots or marks thereon which are properly aligned with the marks 31 on the plugs 30 so that the major and minor axes of the lens are properly positioned in the lens holder. The method of marking the lens with ink, crayon, or other visible means is well known in the art and the method of aligning the lens in any conventional lens holder is well known.

The bifurcations of the jaws 9 and 10 are such as to span the clamp spindle or arbors of an edging machine and lock the pad holder and lenses in correct position relative thereto. When the arbors interengage the pad holder and a lens in position in the machine, the lens holder is thereafter withdrawn.

The pad holder 27 has a conventional pad 32 thereon, which pad may be of any suitable material for securely engaging a surface of the lens without injuring same.

Referring to Fig. 2, a lens 11 is shown gripped in proper aligned position between the jaws 9 and 10.

Neglecting friction the upward force FL of the lens multiplied by the distance D to the pivot 22 must be substantially equal to the spring force F multiplied by the distance X between the pivots 26 and 22 in both positions shown in Figs. 2 and 3.

In Fig. 3, the spring 7 is more compressed than in Fig. 2. Therefore, the force F3 of the spring arm 7 is greater than the force F2 of said spring arm. Also in Fig. 3, the distance X3 between the line of force F3 and the pivot 22 has changed due to the sliding of the pivot 26 in the slot 25. The distance D3 from the pivot 22 to the pivot of the force FL3 of the lens on the finger 10 has changed due to the shift in angle of the finger 10.

The lens holder is so designed that the FL force on the lens is substantially the same in both Fig. 2 and Fig. 3 because the distances X and D change substantially the right amount to compensate for the change in the force F.

The effective length of the link arm varies inversely as the force applied to the handle so proportionately that the upward force FL of the lens remains substantially constant. While the lens holder may be made in different sizes to accommodate lenses of different thicknesses and also a varying number of lenses in a lens group, the characteristics of a lens holder remains substantially unchanged. While a larger spring 8 for the base and movable arms 6 and 7 may be used, depending upon the particular job for which the device is designed, the theory of operation remains unchanged in that, regardless of the force of the spring member 8 which will increase the lens pressure FL, the FL force will be substantially constant considering the increase in applied force to either a single lens or a multiplicity of lenses.

In Fig. 3, it is noted that the lenses 11 have a spacer 33 therebetween. The spacer may be of paper, rubber, or any other suitable material depending upon the particular pressure treatment to which the spacer will be subjected.

In Fig. 4, the prong 9 is supporting a pin 29 which positions the pad holder between the lower jaws 9 of the lens holder. The pad holder 27 is shown having a washer or pad 32 thereon while the lens 11 is being engaged by one of the fingers of the furcated member 10.

From the foregoing, it will be seen that the lens holder may be used to grip one or more lenses in its jaws and that there will be no need for application of additional pressure to the lens holder once the lens has been properly set within the jaws of the lens holder by simply releasing the arms 6 and 7 so that they tend to return to a normal position. The present invention with a given pressure between the opposing jaws of the lens holder will have substantially said pressure constantly applied thereto at all times. In the former types of constant pressure lens holders, the application of additional tension was ordinarily required to firmly grip the lens. In the present invention, the mere release of the force automatically holds the lens in position and no further application of force is required, since the natural tendency of the spring 8 to separate the arms 6 and 7 will automatically increase the effective length of the distance X so that the increased leverage will compensate for the natural reduction of spring tension and therefore retain substantially the same given pressure on the lens or lens group.

While the pressure compensating means has been herein specifically shown as a link having a slot therein, it is to be understood that the specific slot shown is for purpose of illustration only, and the pressure compensating means may consist of a link member having an arcuate slot in contradistinction to the straight slot shown in the drawing. As has been set out hereinbefore, the various materials and arrangement of parts may be diversified. Consequently, the particular shape of the slot may change as a result of the mechanical construction to obtain a nicety of constant pressure achievement depending upon certain variable characteristics. While the particular shape of the slot may vary, it is to be understood that the function of maintaining a substantially constant pressure on the jaw end of the device, with a variable-applied force to the handle end, basically remains the same for any device which may be manufactured in accordance with the spirit of the invention as set forth in the subjoined claims. The unique method of achieving this result for handling fragile articles such as lenses will remain fundamental regardless of the particular shape of the elongated slot in the link member embracing the pressure compensating feature.

Having described my invention, I claim:

1. A lens holder having a pair of rigid arm portions, expandable resilient means connecting one end of said arm portions, a pair of bifurcated members pivotally connected together, for gripping a lens therebetween one of said pair of bifurcated members being rigidly connected to the free end of one of said arm portions, a rigid arm slidably connecting the other of said bifurcated members to the free end of the other of said arm portions, on the side of the pivot opposed to the gripping portions of said bifurcated member, said slide connection being such as to vary the effective leverage length of the rigid arm substantially proportionately to the variation of resilient force exerted by the resilient means at different positions of adjustment, whereby the expandable force of the resilient means connecting the arm portions will apply a substantially constant compression force on said pair of bifurcated members toward each other regardless of the angle therebetween.

2. A lens holder having a pair of jaws pivotally connected for gripping a lens therebetween, an expandable resilient member tending to urge the pair of jaws together, and a rigid arm portion slidably connecting one of said jaws to said expandable resilient member, and arranged so that the effective leverage length of the rigid arm portion between the expandable resilient member and one of said jaws will be varied proportionately to the degree of expandability of the resilient member to maintain a substantially constant pressure intermediate said pair of jaws regardless of the variation of the magnitude of the force applied to the arm by the resilient member.

3. A lens holder adapted for inserting a lens in a lens grinding machine, said lens holder comprising a pair of arms connected together by a springlike portion for normally forcing said arms apart adjacent one end thereof, a pair of forked jaws being pivotally connected together with one of said jaws being securely fastened to one of said pair of arms, a rigid arm on the other of said jaws having a slot therein and being disposed adjacent the free end of the second of said arms, a recessed portion in the free end of the second of said arms adapted to receive the end of said rigid arm having the slot therein, and pin means for slidably connecting the recessed portion of the free end of said arm with the slot in said rigid arm.

4. A lens holder of the class described comprising a handle portion, a pair of lens gripping members pivotally connected one to the other with one of said lens gripping members securely connected to the handle portion, springlike means for urging one of said lens gripping members toward the other of said lens gripping members, and a slidable pressure compensating arm connected intermediate said springlike member and one of said lens gripping members and so arranged that a variation in the tension of the springlike means will change the length of the compensating arm to afford a substantially constant pressure of said lens gripping members toward each other regardless of the tension force of the springlike means.

5. A holding device comprising a pair of elongated arms resiliently connected for varying spacial movement relative to each other, one of said arms having a bifurcated member adjacent one end thereof and a pivot bearing portion intermediate said bifurcated member and said arm, a second bifurcated member pivotally connected with the pivot bearing portion and having gripping end means disposed to one side of said pivot and movable toward and away from the first bifurcated member and having a slide connection with the second of said elongated arms on the side of the pivot opposite the gripping end means of said bifurcated member, said slide connection being such as to direct substantially an equal bearing pressure force to the gripping end means of the second bifurcated member at varying spacial movements of the gripping end means relative to the first bifurcated member.

6. A holding device of the character described having a handle portion, a pair of gripping members pivotally connected together intermediate the ends thereof with each of said gripping members having gripping portions with one of said gripping portions being movable toward the other about said pivot, one of said gripping members being rigidly connected with the handle, the other of said gripping member having a slide portion on the side of the pivot opposite its gripping end and a resiliently supported member slidably connected with said slide portion for urging the gripping end of the gripping member having said slide portion thereon towards the gripping end of the gripping member carried by the handle, said slide connection being arranged to compensate for the variation of the magnitude of force directed to said associated gripping member through the resiliently supported member whereby a substantially constant pressure force of said gripping members toward each other will be introduced regardless of the position of adjustment thereof relative to each other.

7. A device of the character described comprising a pair of gripping members each having a gripping end portion, one of said gripping members being rigidly connected with a handle portion, the other of said gripping members being pivotally connected to the first gripping member intermediate the gripping end thereof and the handle portion, a second handle portion supported for resilient movement relative to the first handle portion and having a slide connection with the second gripping member on the side thereof opposite its gripping end, said slide connection being arranged to transmit a substantially constant gripping pressure at the gripping ends of the gripping members regardless as to the variation of the magnitude of force introduced by the resilient means.

8. A lens holder for gripping a lens, comprising an expandable resilient member connected to a pair of elongated arms, a link member pivotally connected to one of said elongated arms, said link member having a slotted portion extending outwardly to one side of the pivotal connection and means slidably connecting the slotted portion of the link member to the free end of the other of said elongated arms, said first elongated arm having gripping means thereon and said link member having portions protruding outwardly of the pivotal connection on the side thereof opposite the slotted portion and having gripping portions adapted to function cooperatively with the gripping means on the first elongated arm.

WILLIAM J. JOYCE.